United States Patent
Chaya

[11] Patent Number: 5,979,755
[45] Date of Patent: *Nov. 9, 1999

[54] AUTO-CHANGER

[75] Inventor: Masahiko Chaya, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/552,107

[22] Filed: Nov. 2, 1995

[30]     Foreign Application Priority Data

Nov. 8, 1994  [JP]  Japan .................... 6-273513

[51] Int. Cl.⁶ ...................................... G06K 5/00
[52] U.S. Cl. ........................................ 235/383; 235/385
[58] Field of Search ..................... 235/383, 385; 360/94

[56]              References Cited

U.S. PATENT DOCUMENTS

| | | | |
|---|---|---|---|
| 4,742,405 | 5/1988 | Teranishi | 360/92 |
| 4,937,690 | 6/1990 | Yamashita et al. | 360/94 |
| 4,984,108 | 1/1991 | Grant et al. | 360/94 |
| 4,996,680 | 2/1991 | Staar | 369/37 |
| 5,059,772 | 10/1991 | Younglove | 235/383 |
| 5,061,127 | 5/1991 | Inoue et al. | 360/94 |
| 5,303,214 | 4/1994 | Kulakowski et al. | 235/385 |
| 5,323,327 | 6/1994 | Carmichael et al. | 235/383 |
| 5,341,352 | 8/1994 | Isobe | 369/37 |
| 5,450,254 | 9/1995 | Sato et al. | 360/94 |
| 5,541,896 | 6/1996 | Ashby | 360/98.04 |
| 5,561,604 | 10/1996 | Buckley et al. | 364/479.05 |

*Primary Examiner*—Michael G. Lee
*Assistant Examiner*—Mark Tremblay
*Attorney, Agent, or Firm*—Fitzpatrick, Cella, Harper & Scinto

[57]              ABSTRACT

An auto-changer has a shelf which holds magazines that contained differently sized cartridges. The magazines are conveyed to a recording/reproducing device and include discrimination information concerning the cartridges contained therein. Sensors detect the discrimination information, and a conveyor conveys the magazine between the housing shelf and the recording/reproducing devices based on the detected information.

2 Claims, 15 Drawing Sheets

(6B-6B SECTION)

(6C-6C SECTION)

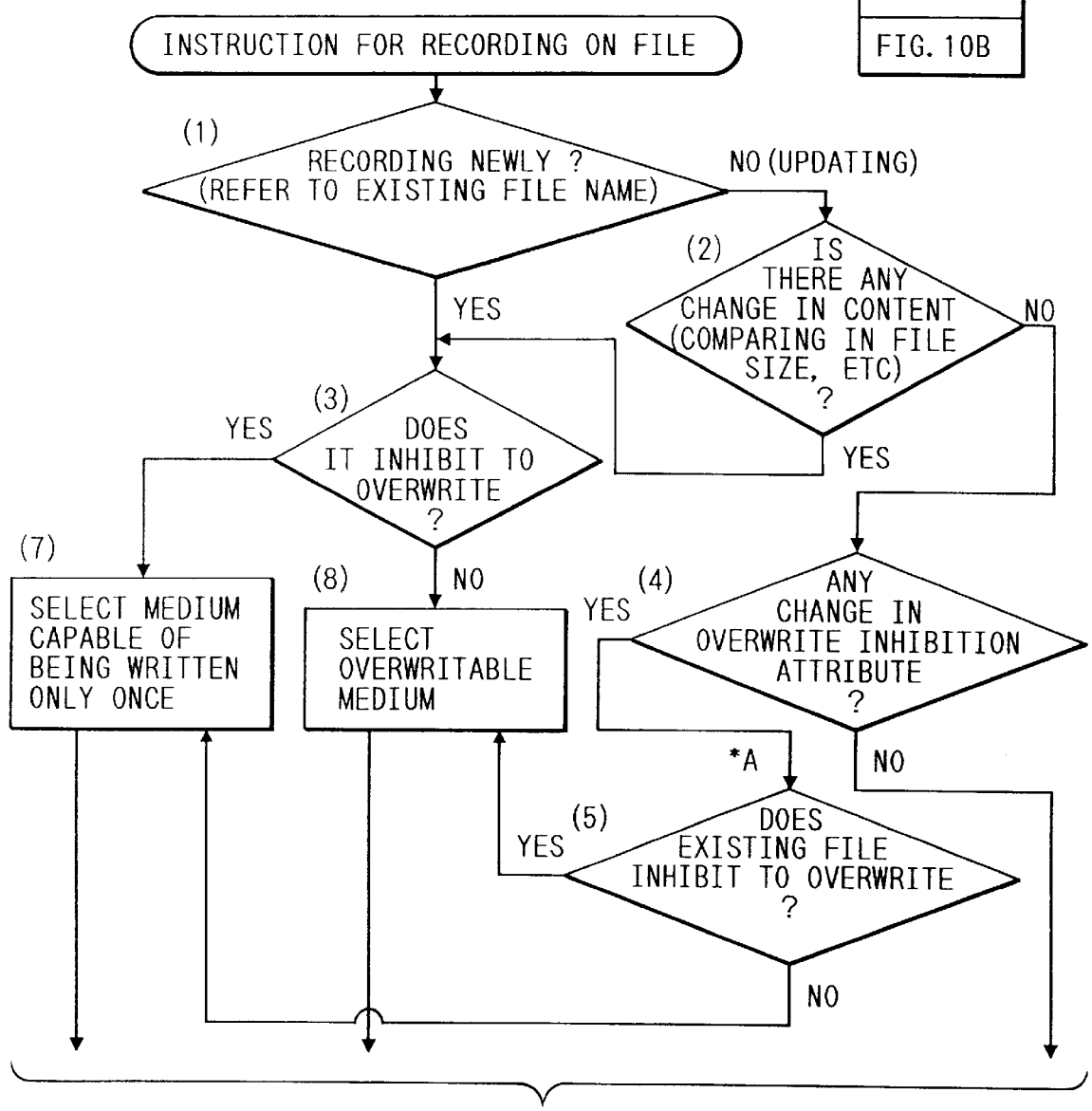

AUTO-CHANGER

BACKGROUND OF THE INVENTION

1. Field of the Invention

This invention relates to an auto-changer adapted to contain recording mediums in a plurality of units directly therein or in a cartridge, take out a desired one of the contained recording mediums and convey it to a recording/reproducing apparatus.

2. Related Background Art

An auto-changer 201 according to the prior art is of such a construction as shown in FIG. 1 of the accompanying drawings and is comprised of an apparatus 202 for recording and/or reproduction (hereinafter referred to as the recording/reproducing apparatus), housing shelves (not shown) in which a plurality of cartridges 203 are housed in parallelism to one another, and conveying means 204 for moving the cartridges 203 in vertical directions indicated by arrows by suitable driving means (not shown).

When for example, a recording medium in the sixth containing shelf from below is to be used, the conveying means 204 is moved to the position of the sixth housing shelf from below and the cartridge 203 therein is conveyed to and placed in the conveying means 204 by a suitable carrying mechanism (not shown). After the cartridge 203 has been placed, the conveying means 204 is moved downwardly and brings the cartridge 203 to the position of the cartridge insertion port of the recording/reproducing apparatus 202.

The cartridge 203 is discharged from the conveying means 204 and is inserted into and mounted in the recording/reproducing apparatus 202. When access is to be obtained to another medium, the cartridge is discharged from the recording/reproducing apparatus 202 and is returned to the housing shelf, and the conveying operation for the next cartridge 203 is entered.

The addition of a new caridge to the housing shelf is accomplished by inserting the cartridge into the conveying means 204 through the insertion port 205, moving the conveying means 204 and conveying the cartridge to a desired empty housing shelf. Also, the interchange of a cartridge is accomplished by the conveying means 204 conveying the cartridge 203 to be interchanged from the housing shelf to the insertion port 205, discharging it from the insertion port 205 and introducing a new cartridge 203 as described above.

The auto-changer according to the prior art registers and controls recording mediums for each one unit (one cartridge) and conveys them to the recording/reproducing apparatus, and mounts and dismounts them. Accordingly, it is necessary that the conveying mechanism be returned to the housing shelf each time recording mediums in one unit (one cartridge) are interchanged, and this leads to the waste of much time during the interchange of the cartridge. Particularly, the waste of time is enlarged more for recording mediums of small memory capacity in one unit (one cartridge). Also, the recording/reproducing system is designed to interchange the same recording mediums in a single form and therefore, the form of data to be recorded is limited as shown in the following example.

For example, a recording medium in the form of a tape is used for the recording of data such as moving images, from the viewpoint of a great capacity and continuity. The recording medium in the form of a tape, however, is extremely inferior in performance due to its structure, with regard to the access to arbitrary data. Also, in a searching apparatus such as a library in which the size of individual files is small but the number of the files is enormous, use is made of recording mediums in the form of a disc excellent in accessibility, but such recording mediums are unsuitable for the recording of a great deal of continuous data. Further, for the memorization of documents to be permanently preserved, use is made of recording mediums of the recording type (not requiring overwriting) which is capable of recording only once.

As described above, in the multimedia system, it is necessary that data in different forms such as moving images, static images, voices and documents be made mixedly present at a time and frequently interchanged for use. So, in terms of the system construction, it is possible to connect individual recording/reproducing apparatuses (including apparatuses of the changer type) differing in recording form through a network, select and use an apparatus conforming to the form of recorded data. However, when the installation locations of the recording/reproducing apparatuses are dispersed, physical custody or the like for the preservation of recording mediums becomes difficult. Also, when a plurality of recording/reproducing apparatuses are concentratedly installed at a location, there are left problems such as the connectability to the network and the necessity of maintenance of each apparatus.

SUMMARY OF THE INVENTION

The present invention has been made in view of the above-noted problems and the object thereof is to provide an auto-changer for the multimedia system which can suitably select and use the best-suited recording medium irrespective of the amount of information to be recorded/reproduced and the utilization form of data and moreover permits custody such as preservation or maintenance to be done easily and thus is high in versatility.

The above object is achieved by an auto-changer provided with:

magazines containing recording mediums in a plurality of units therein:

a housing shelf on which said magazines can be interchangeably installed in a plurality;

recording/reproducing means for effecting recording and/or reproduction on said recording mediums; and conveying means for conveying said magazines between said housing shelf and said recording/reproducing means;

each of said magazines being provided with discrimination information, said conveying means being controlled on the basis of said discrimination information.

DESCRIPTION OF THE PREFERRED EMBODIMENTS (First Embodiment)

Figure 1:
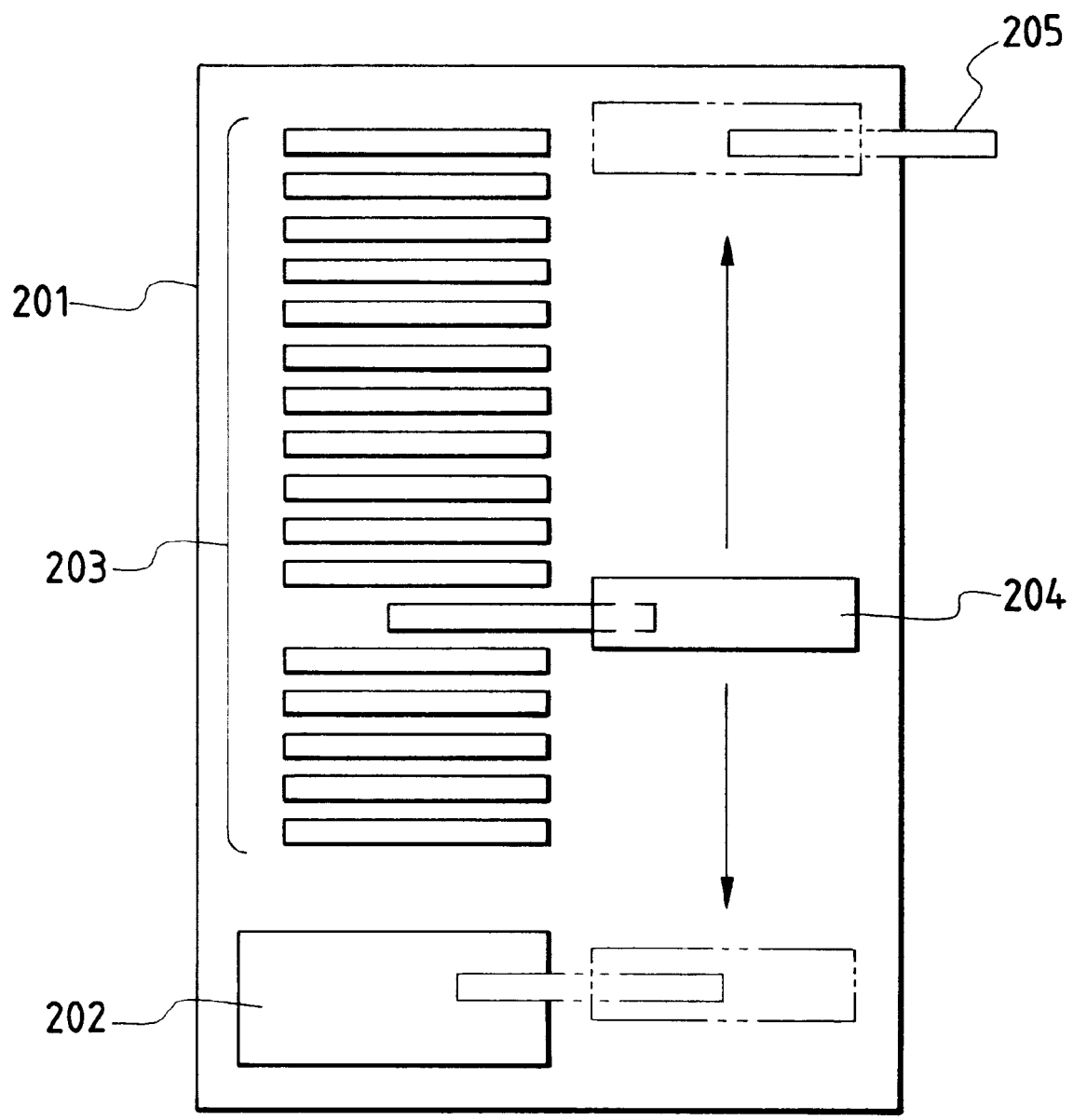
FIG. 1 is a side cross-sectional view showing an example of the prior art.
Figure 2A:
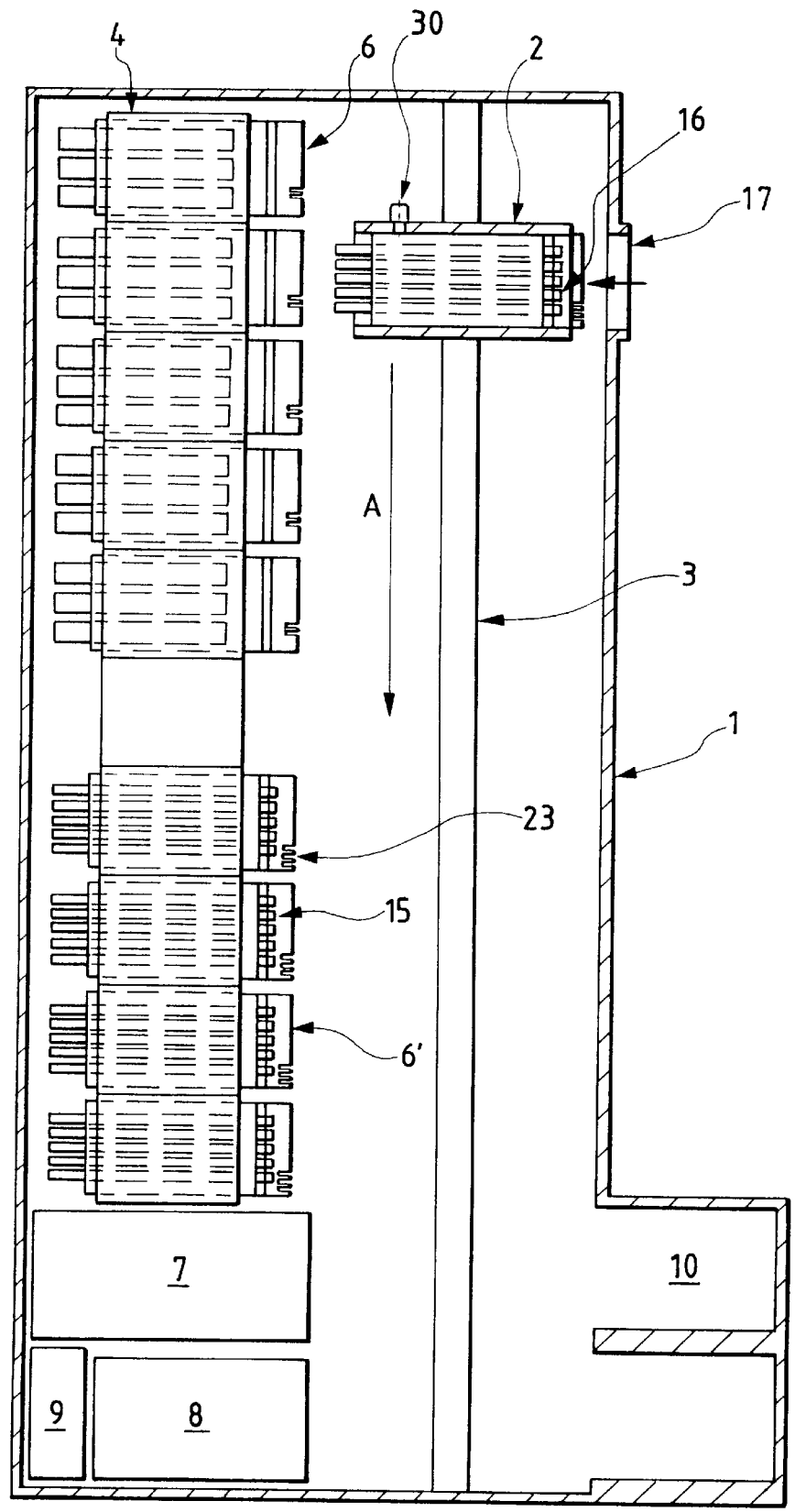
FIGS. 2A and 2B are side cross-sectional views of an auto-changer according to a first embodiment of the present invention.
Figure 2B:
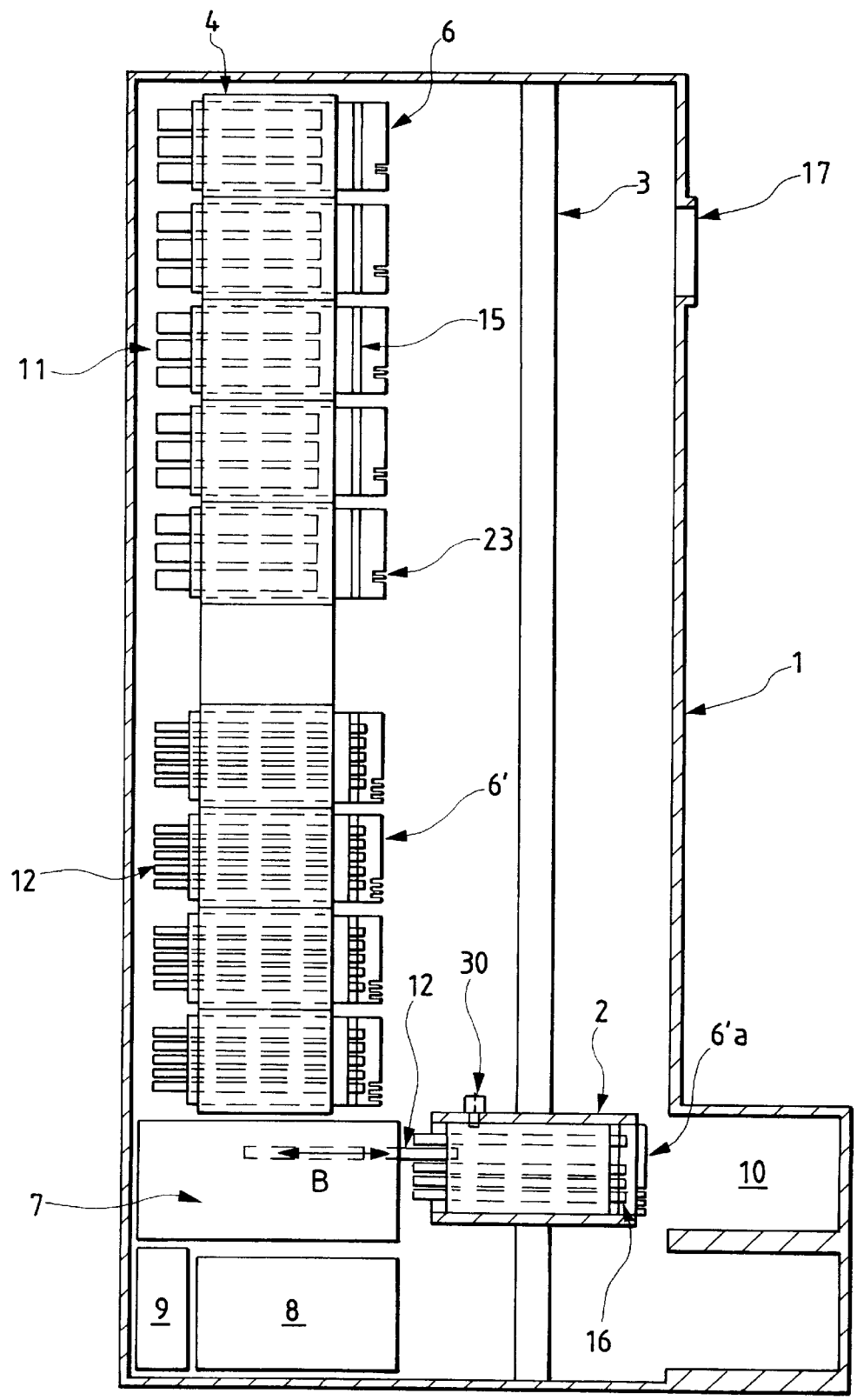

An embodiment of the present invention as first means will hereinafter be described specifically with reference to FIGS. 2A to 4. In FIGS. 2A and 2B, the entire auto-changer 1 according to the present invention is shown in cross-section. Cartridges 11 contain therein tape recording mediums of the magnetic recording/reproducing type for recording moving images thereon, and cartridges 12 contain therein disc recording mediums of the magneto-optical recording/reproducing type. For each of the same kind of recording mediums, the cartridges are contained in a plurality of units in magazines 6 and 6'(see FIG. 3).

Figure 3:
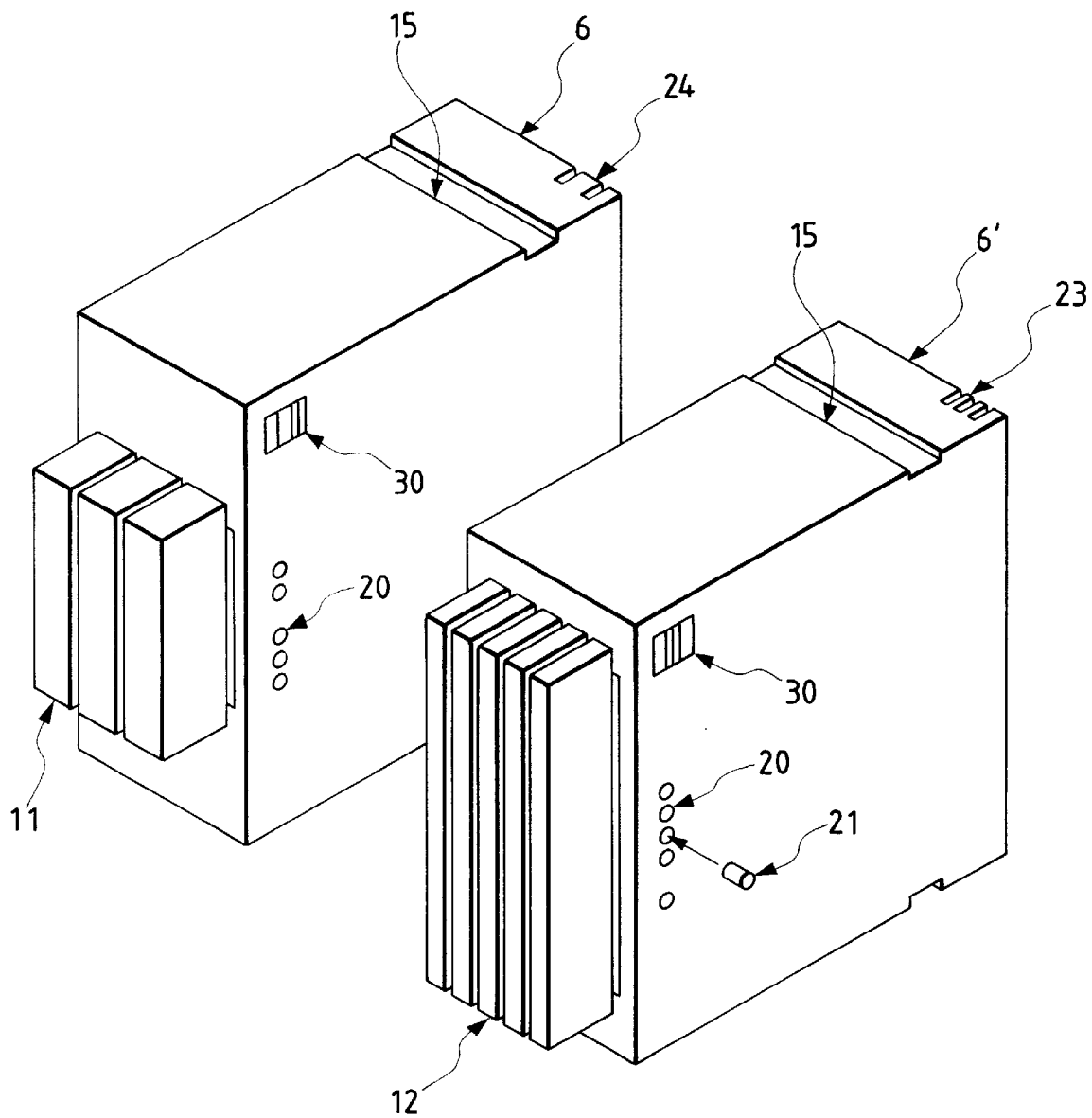
FIG. 3 is a perspective view of magazines containing therein different kinds of recording medium containing cartridges discretely and discriminators thereon.

As shown in FIG. 3, the recording medium containing portions of the magazines 6 and 6' are formed by the shaped of the recording medium containing cartridges, and so as to be capable of conveying these by one and the same conveying mechanism, configurational portions related to the conveying mechanism, for example, grooves 15 engaged by a horizontal transfer mechanism (not shown) when a magazine is moved between a housing shelf 4 and the magazine carrying portion 2 of the conveying mechanism and the outer dimensions of a portion fitted to the magazine carrying portion 2 are made identical. Thus, only one magazine conveying mechanism comprised of the magazine carrying portion 2, a conveying mechanism 3 in a vertical direction (the direction of arrow A) and the horizontal transfer mechanism (not shown) can cope with all the conveyance of different kinds of recording mediums.

Figure 4:
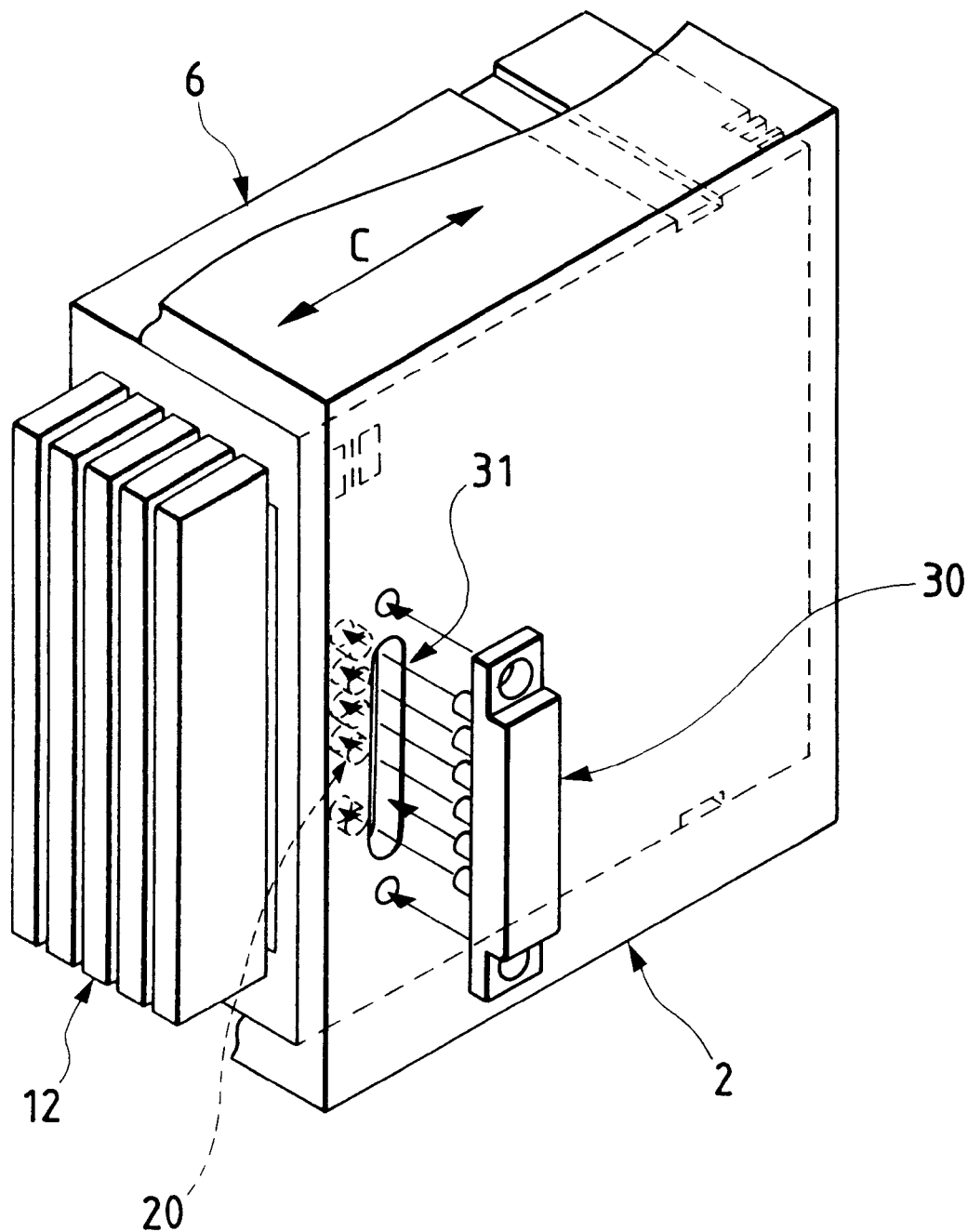
FIG. 4 is an illustration of detecting means for the discriminators.

The magazines 6 and 6' are provided with discriminators 20, 23 and 30 for distinguishing between the recording/reproducing systems for the recording mediums contained therein, the numbers of the recording mediums contained, the contained positions and the magazines. the discriminators 20 is comprised of a hole 20 and a pin 21 removably insertable thereinto, and can arbitrarily change discrimination information. FIG. 4 shows detecting means for the discriminators 20. When the magazine 6 is inserted in the direction of arrow C relative to the magazine carrying portion 2 of the conveying mechanism, a detection switch 30 disposed in the direction of arrangement of the holes detects the presence or absence of the hole 20 by the detection pin thereof through a through-hole 31 on the magazine carrying portion 2. The use of an optical sensor as other detecting means is also possible.

A similar detection system is also applicable to the discriminator 23 of the groove type. Also, a magnetic pattern, a hologram, a bar code or the like is adopted as the discriminator 30 and can cope with the detection of a greater amount of information. The disposition and construction of the discriminator 30 can be contrived by using or replacing it with the aforedescribed discriminators utilizing the characteristics of the shaped of the holes and grooves.

Description will hereinafter be made of the mode of use when the discriminators 20 are used for the discrimination of the positions and number of the recording medium containing cartridges in the magazine and the cut-away 23 (discriminator) is used for the discrimination of the recording/reproducing system for the recording mediums.

FIG. 2A shows a case where a magazine is newly registered. When a magazine register command is called for upon the auto-changer 1, the conveying mechanism 3 is controlled by control means (not shown) and the magazine carrying portion 2 is moved to the position of an insertion port 17 and stands by there. Then, the magazine 6 inserted through the magazine insertion port 17 is received by the magazine carrying portion 2, and the conveying mechanism is controlled by the control means to thereby convey the magazine onto the empty housing shelf 4. At this time, magazine custody data such as the name and content of the magazine transmitted from an outside apparatus and the magazine contained position are stored in a memory device 9, thus completing the registration.

FIG. 2B shows a case where a magazine 6'a containing optical disc cartridges 12 therein has received an access command from the outside. Here, by referring to the memory device 9 by the control means (not shown), the magazine 6'a is taken out from the housing shelf into the magazine carrying portion 2. A cut-away groove 23 in a side of the magazine 6'a is detected by a detector 16 provided on the magazine carrying portion 2 to thereby discriminate the recording/reproducing system for the recording medium and select a suitable drive apparatus (recording/reproducing apparatus) 7. Further, the hole 20 of the discriminator is detected by a detector 30 provided on the magazine carrying portion 2 to thereby read the position and number of the cartridges and calculate the conveyed position of a selected cartridge 12 in the direction of arrow A. When the conveyed position of the magazine 6'a is determined and the cartridge 12 is conveyed to the position of the insertion port of the drive apparatus 7, the cartridge 12 is inserted in the direction of arrow B by a cartridge conveying mechanism (not shown).

When an access command to the magazine 6 containing magnetic tape cartridges 11 therein is received after the insertion has been completed, the magazine 6'a is pressed against a magazine retraction shelf 10 from the magazine carrying portion 2 and is temporarily retracted thereinto, and the magazine carrying portion 2 now empty is moved in the direction of arrow A to receive the magazine 6.

The conveyance of the magazine 6 containing the magnetic tape cartridges 11 therein and the insertion of a cartridge 11 into a magnetic tape recording/reproducing apparatus 8 are effected in a procedure similar to that in the case of the above-described optical disc.

In this manner, by providing the retraction shelf 10, the time for returning the magazine 6'a to the housing shelf 4 can be shortened and the housing of the cartridges 12 into the magazine 6'a and the control of the conveying mechanism can be simplified. Thus, it is possible to edit and condense moving images on a magnetic tape device and record them on an optical disc, and deal with an automatic backup system for the data on the optical disc by a single auto-changer.

(Second Embodiment)

Figure 5A:
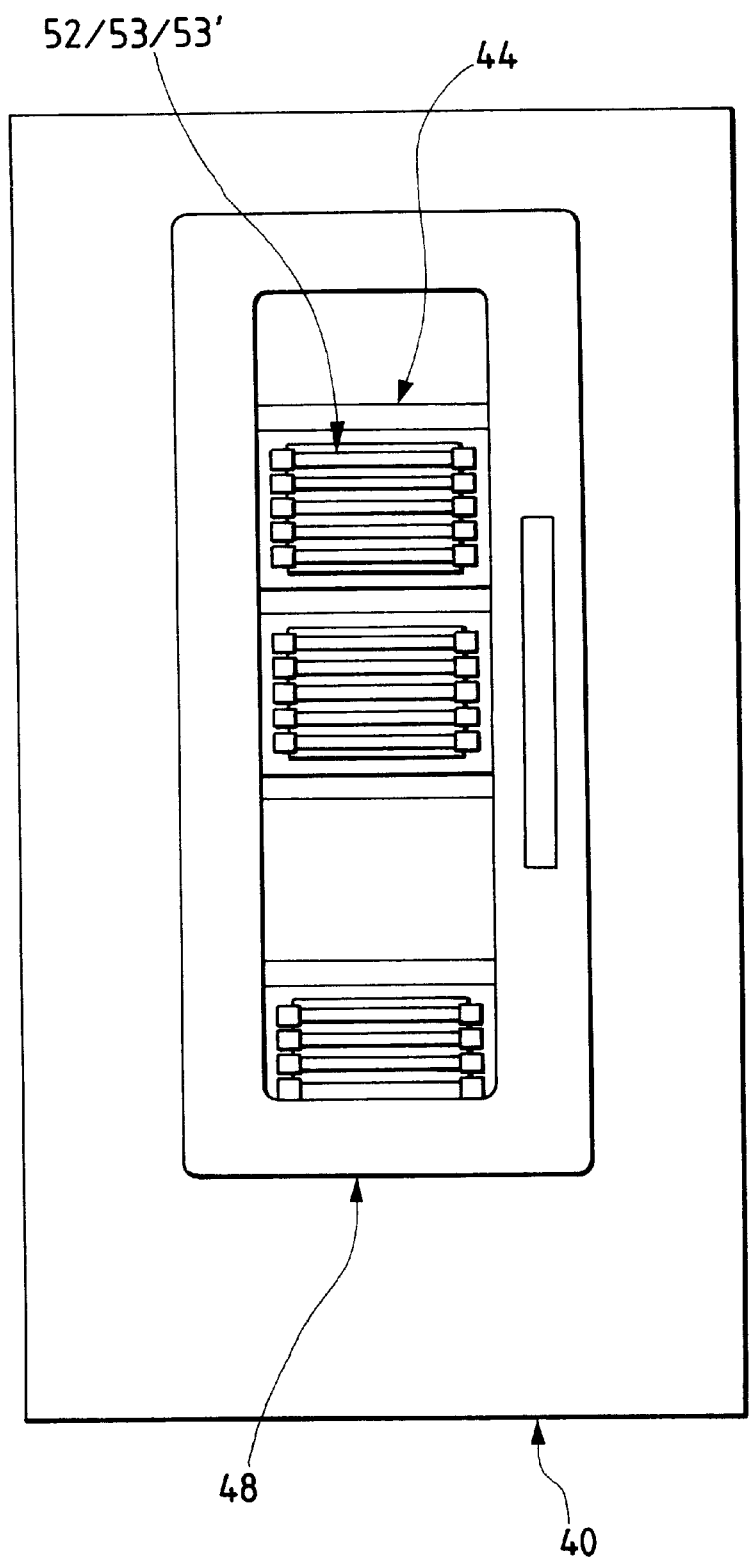
FIGS. 5A and 5B are a front view and a side cross-sectional view, respectively, of an auto-changer according to a second embodiment of the present invention.
Figure 5B:
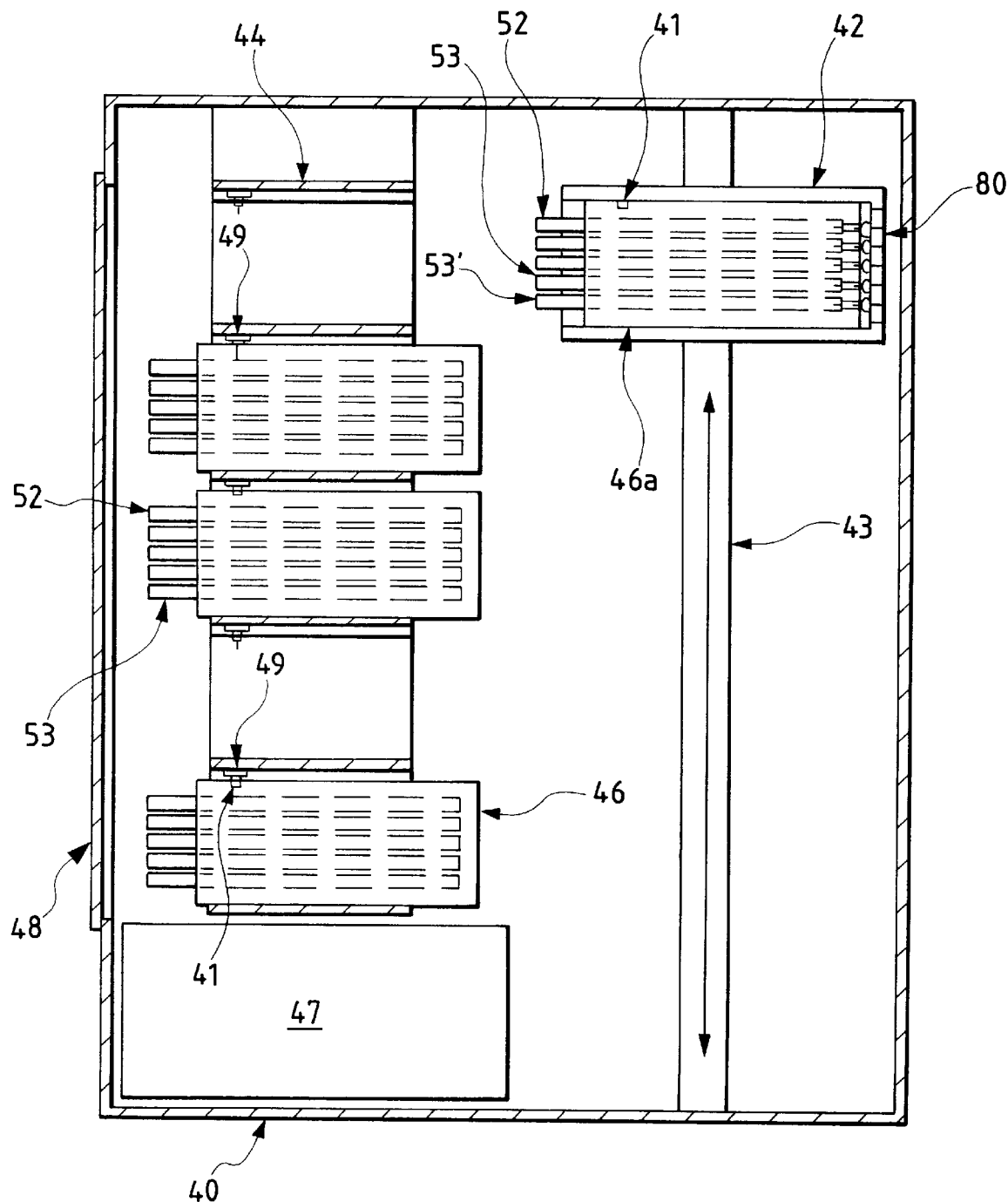

An embodiment of the present invention as second means will hereinafter be described with reference to FIGS. 5 to 7B and FIGS. 10A and 10B. Cartridges 52 and 53 shown in FIGS. 5A and 5B are molded into substantially the same shape, and the cartridges 52 contain therein optical discs exclusively for reproduction and the cartridges 53 contain therein magneto-optical discs capable of recording/reproduction. A magazine 46 containing these therein can be loaded and interchanged arbitrarily into a housing shelf 44 disposed at the back of a front door 48 by removing the front door 48, without the intermediary of a conveying mechanism.

Figure 6A:
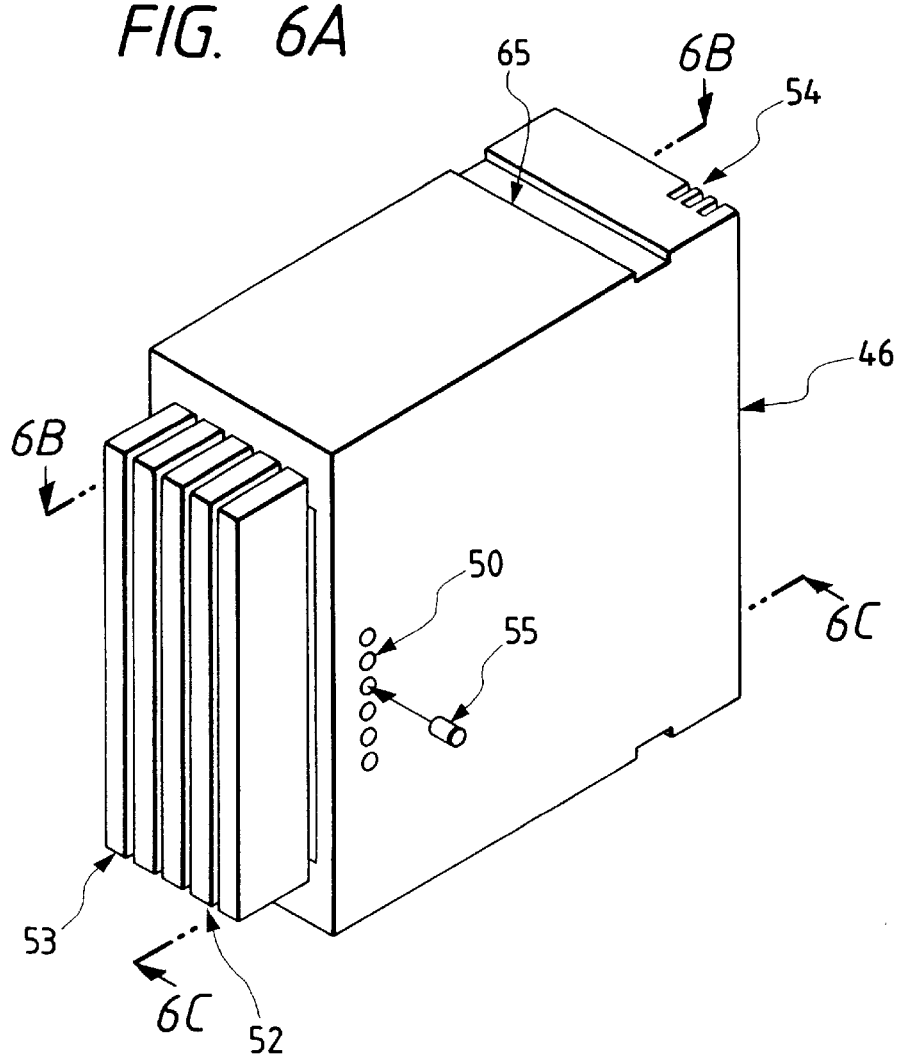
FIGS. 6A to 6C are illustrations of a magazine in which cartridges are mixedly contained with different kinds of recording/reproducing systems distinguished from one another.
Figure 6B:
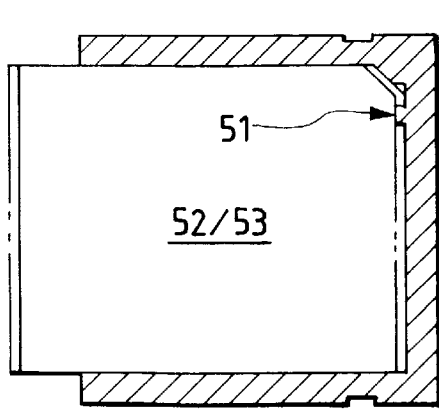
Figure 6C:
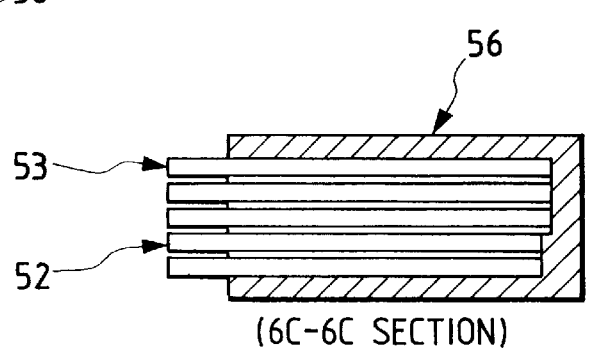

As shown in FIGS. 6A to 6C, the cartridge 52 containing optical discs therein is formed with a cut-away 51 in the edge portion thereof on the insertion side with respect to the magazine 46, and the cartridge 53 containing magneto-optical discs therein is formed flatly. A protrusion is formed in the cartridge containing portion of the magazine 46 at a location for engagement with the cut-away 51, whereby the loaded positions of the cartridges 52 and 53 are prescribed (see the section 6B–6B of FIG. 6B and the section 6C–6C of FIG. 6C).

Figure 7A:
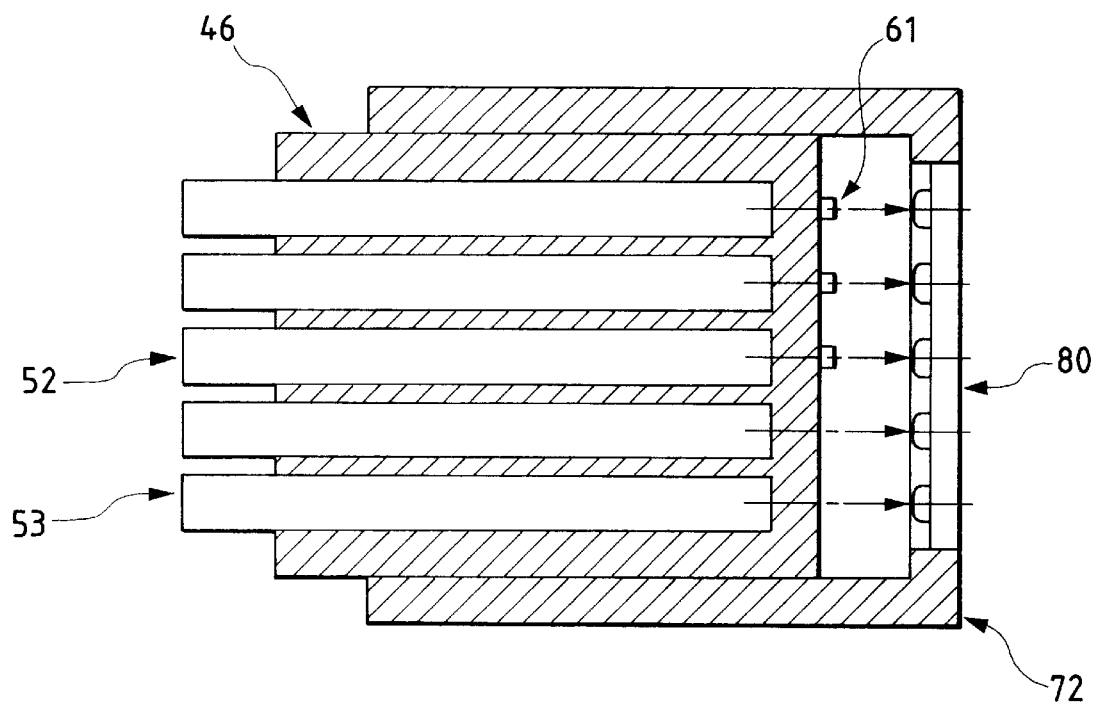
FIGS. 7A and 7B are illustrations of means for effecting the transmission of information with regard to the discriminators of cartridges in different kinds of recording/reproducing systems.
Figure 7B:
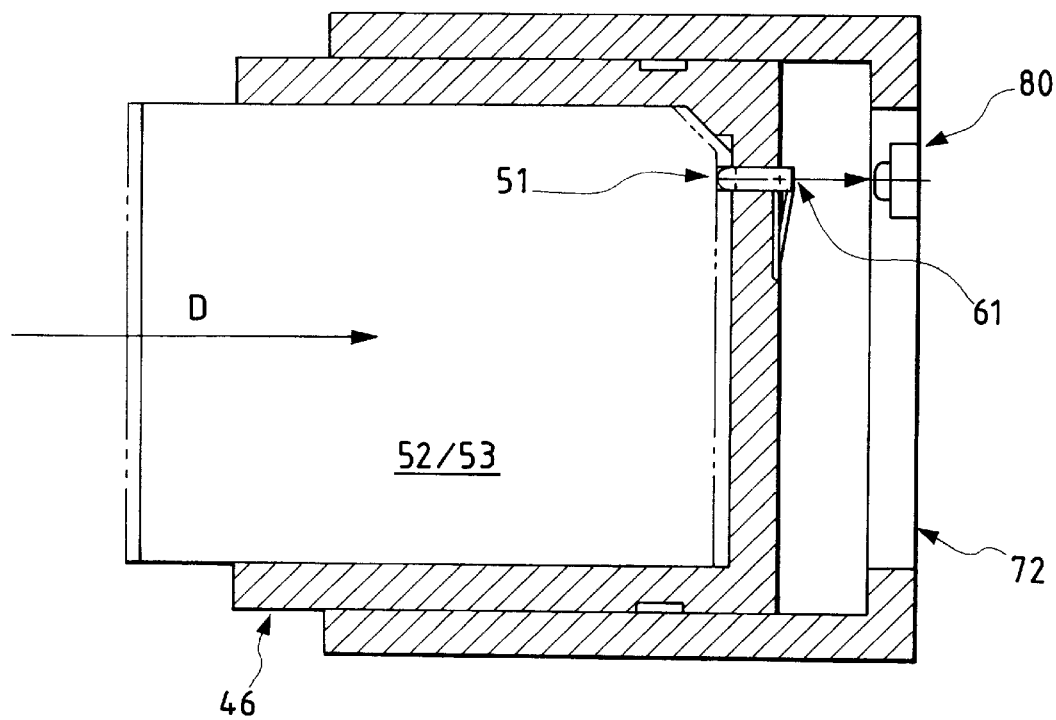

In FIGS. 7A and 7B, there is shown a case where a movable member 61 engageable with the cut-away 51 of the cartridge is provided for the magazine 46 so that the presence or absence of the cut-away may be electrically transmitted to the outside of the magazine 46.

Description will hereinafter be made of the mode of use of the auto-changer of FIGS. 5A and 5B when the magazine shown in FIGS. 7A and 7B are used. When the front door 48 of the housing shelf 44 is opened and the magazine 46 is housed in the housing shelf, a discriminator 41 provided on a side of the magazine 46 and similar to the hole 20 of FIG. 3 can be read by a detector 49 provided on the housing shelf 44. At this time, the inputting of magazine custody information is called for upon a system (not shown) connected from the auto-changer 40, and the read code of the discriminator 41 is made to correspond to the input information called for and is stored in a memory device (not shown) in the auto-changer 40. Thereby, the registration of the magazine is completed.

When this registering work is completed, the discriminator 41 and the magazine 46 correspond to each other at one to one and therefore, the magazine 46 is taken out of the housing shelf and the re-housing thereof into any position becomes possible. Also, when a demand for the access to a particular magazine 46a is received from the aforementioned connected system, the content of the aforementioned memory device is referred to and the housed position is searched for, and a magazine carrying portion 42 is moved in the direction of arrow and the magazine 46a is selected. Here, the magazine is conveyed to the magazine carrying portion 42 by a horizontal transfer mechanism (not shown). At this time, as shown in FIGS. 7A and 7B, the switch member of a detector 80 provided on the magazine carrying portion 42 and displaceable in the direction of insertion of the magazine and a movable member for transmitting the presence or absence of the cut-away 51 of the cartridge on the magazine 46a which discriminates the recording/reproducing system come into contact with each other to thereby detect the contained state of recording mediums in the magazine. On the basis of this detection signal, the conveyed position of the cartridges 52 and 53 to a recording/reproducing apparatus 47 with a multifunction is controlled.

In the present embodiment, from the merit that optical discs differing in the recording/reproducing system are mixedly contained in a magazine, individual files to be recorded in a magazine can be kept in custody by selecting a recording medium differing in recording characteristic which is suitable for the custody attribute thereof.

Reference is now made to the flow chart of FIG. 10 to describe the auto-changer 40 having ROM-DISC 52 in which an information source is contained, WORM-DISC 53 capable of being written only once and RAM-DISC 53' such as an overwritable magneto-optical recording medium mixedly contained in the magazine 46 and carrying thereon a recording/reproducing apparatus 47 with a multifunction. The conveying mechanism is controlled on the basis of the detection signal of the discriminator detector 80 and the RAM-DISC cartridge 53 is loaded into the recording/reproducing apparatus 47 with a multifuntion.

When the information files of the aforementioned RAM-DISC 53' are to be edited and worked by the work file on the other memory device of a system (not shown) to which the auto-changer 40 is connected and an information file newly prepared is to be recorded on a recording medium in the magazine 46, the auto-changer 40 effects the selection of a recording medium in the following procedures in accordance with the custody attribute of the file.

When the result of the new file prepared by editing and working the files has its custody attribute set for permanent preservation, the recording of the new file is effected on the WORM-DISC 53 difficult to overwrite (free of wrong erasion) in terms of the physical characteristic of the recording medium, in the procedures of (1), (3), (7), (9), (11), (12), (14), and (6) of FIG. 10.

Also, when only the custody attribute of the existing file on the RAM-DISC 53' has been changed in order to prevent wrong erasion in terms of custody, the "automatic change mode" for automatically changing the recording medium is selected in the procedures of (1), (2), (4), (5), (7), (9), (13), (15), (11), (12), (14) and (6) of FIG. 10. In the present embodiment, it is possible to change the recording medium in the same magazine by the utilization of this automatic changer mode and therefore, it is possible to carry the recording mediums into and out of the auto-changer easily in the unit of magazine without destroying the custody information of the recording mediums and magazine. That is, in a construction wherein the system is completed on the same magazine, the physical bringing-out of a particular file (magazine/cartridge) from the auto-changer is simpler, and more improved in preservability than in the first means.

Also, by applying the automatic change mode, it is easy to construct a system in which, in the construction of the first embodiment, the data of a magneto-optical disc recording medium is automatically backed up on a magnetic tape recording medium of high volume density.

In the present embodiment, the cut-away formed in the recording medium containing cartridge is used for the discrimination of the recording/reproducing system, but alternatively, use may be made of a slide frame member or other discriminator such as a discriminator provided on the magazine of the present invention. In this case, the construction of the recording medium containing portion of the magazine is adapted to the discriminator.

(Third Embodiment)

An embodiment of the present invention as third means will now be described specifically with reference to FIGS. 8A to 9. In this embodiment, magnetic tape cartridges 102 and optical disc cartridges 101 are mixedly contained in one and the same magazine 92 (see FIG. 9). The registration of individual magazines, as in the second embodiment, is effected by detecting a discriminator 108 on a side of a magazine 96 by a detector 109 provided on a housing shelf 94, and relating the result of the detection to custody information such as the name of the magazine and recording it on a memory device 99.

In the first and second embodiments, the shape of the cartridges contained in the magazine is of one kind and therefore, the conveyance control in which the relative position of the recording/reproducing apparatus suitable for the selected recording medium and the magazine carrying portion is detected and a magazine is fed by an amount corresponding to the step interval thereof can be realized by a relatively simple construction. In the present embodiment, however, the shape and number of the contained cartridges are arbitrary and therefore, the absolute positions of the cartridges 101 and 102 relative to the magazine 96 differ for each magazine. Accordingly, when the magazine position is to be controlled by only the detection of the relative positional relation between the recording/reproducing apparatuses 97 and 98 and the magazine carrying portion 92, it is necessary that the kind and number of the recording mediums contained in the magazine and the relative position to the magazine carrying portion be memorized for each magazine and successively calculated during conveyance control to thereby determine the amount of the conveyance control.

Figure 9:
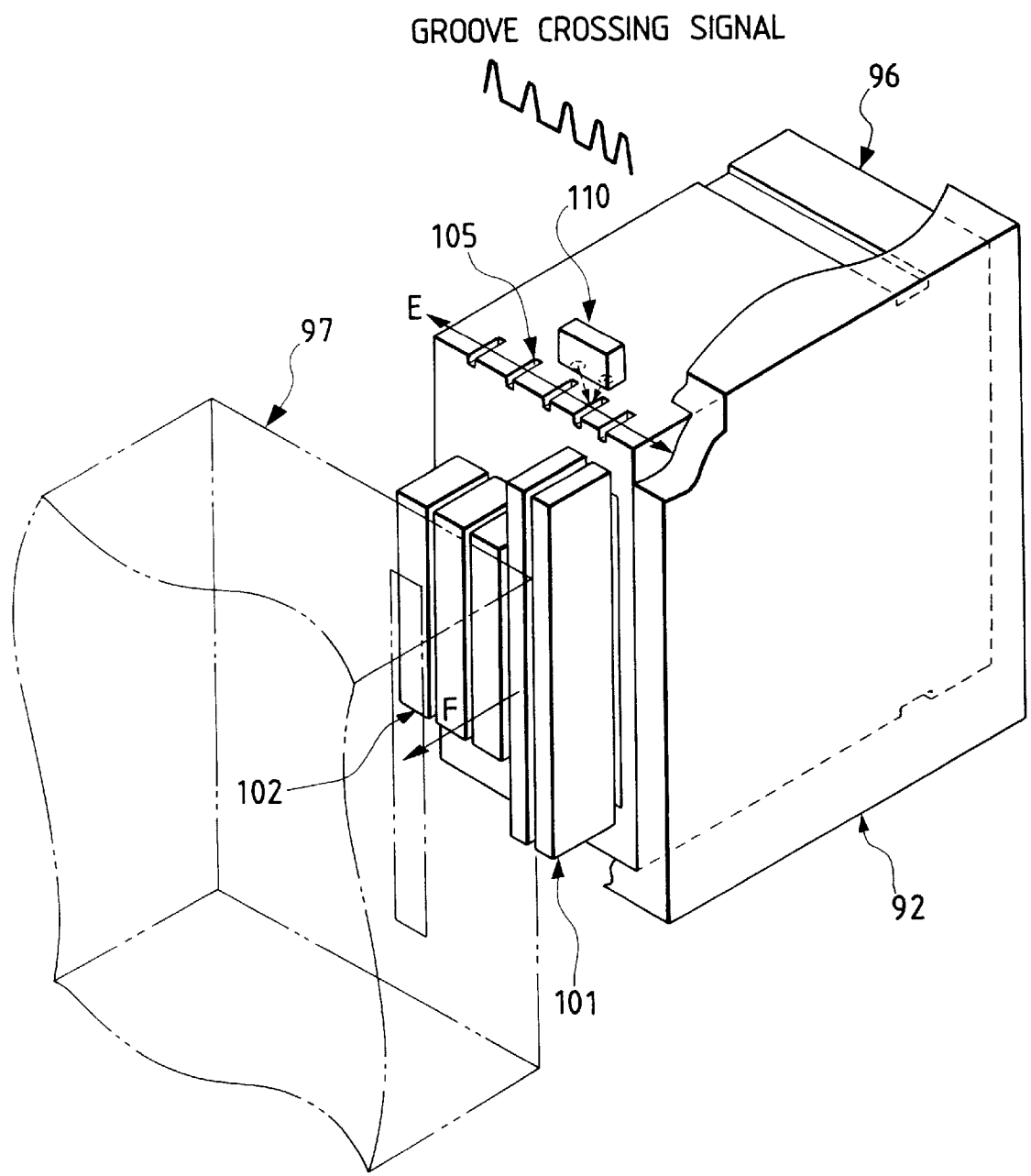
FIG. 9 is an illustration of detecting means for the positions of cartridges in a magazine.

Therefore, as shown in FIG. 9, grooves 105 are formed in the magazine 96 correspondingly to the cartridges and one of them is detected by a detector 110 fixed to the same coordinates system as the drive apparatus to thereby effect conveyance control (the direction of arrow E) to a cartridge insertion port 102. Thereby, positioning becomes readily possible. In the present embodiment, the grooves 105 corresponding to substantially the centers of the cartridges 101 and 102 are formed in a side of the magazine and the positions of the grooves are detected by the reflection type optical sensor 110.

Reference is now had to FIG. 8 to describe the operation of the conveying mechanism when a magnetic tape cassette 102a in a magazine 96a has been selected. In accordance with the registered information of the magazine, the position of the housing shelf is searched for and the magazine carrying portion 92 is moved in the direction of arrow E, whereafter the magazine is placed on the magazine carrying portion 92 by a horizontal magazine moving mechanism (not shown). The magazine carrying portion 92 is then lowered in a direction in which the recording/reproducing apparatus is installed (under the direction of arrow E) and the grooves 105 are scanned by the reflection type optical sensor 110. The intervals between and the positions of the grooves are detected from the scanning signal of the reflection type optical sensor 110 obtained by crossing the grooves. Thereby, the positions and number of the magnetic tape cartridges 102 contained in the magazine 92 are detected, the recording/reproducing apparatus 98 is selected and one (indicated by 102a) of the cartridges is loaded.

Figure 8A:
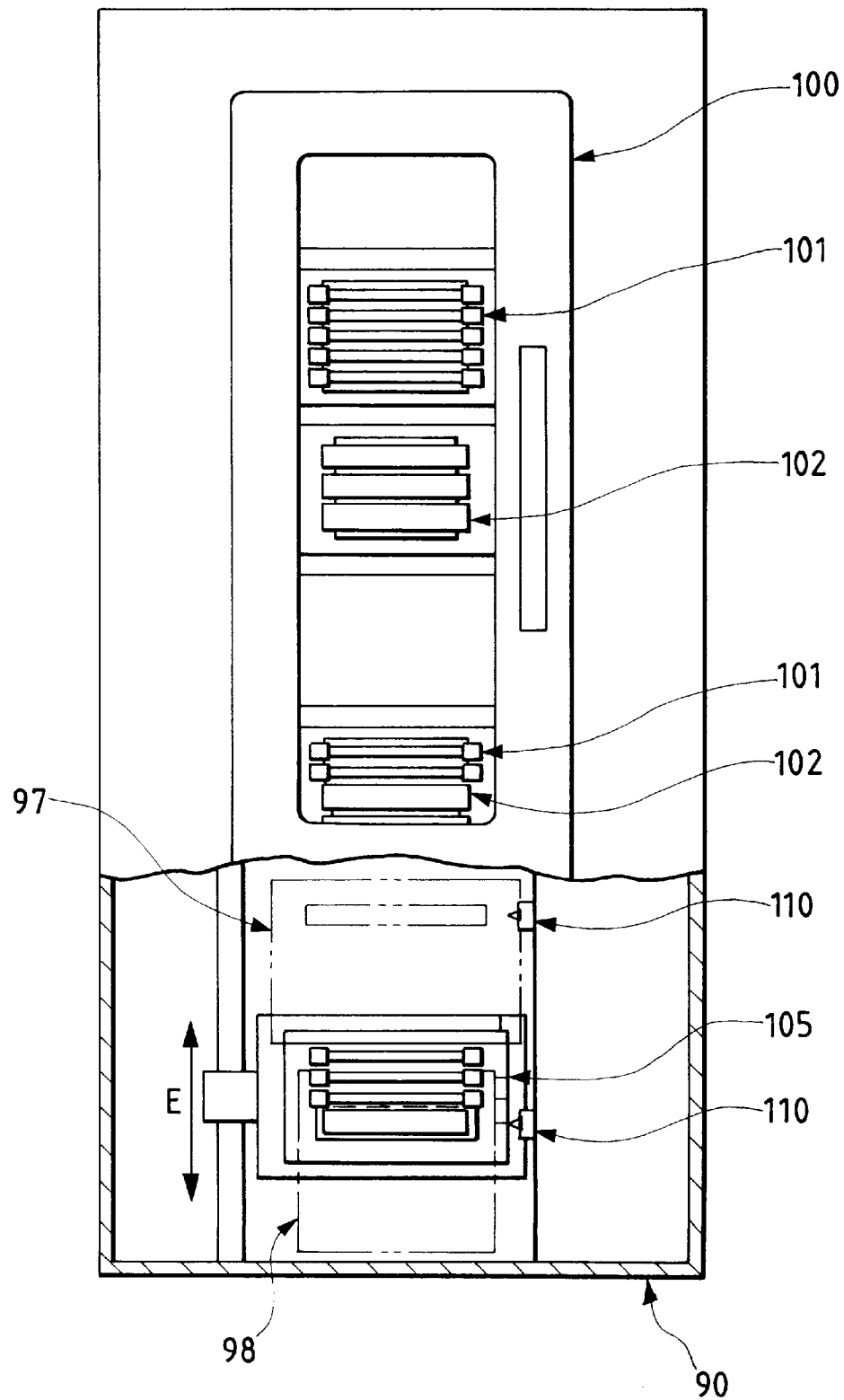
FIGS. 8A to 8C are a front view, a side cross-sectional view and a perspective view, respectively, of an auto-changer according to a third embodiment of the present invention.
Figure 8B:
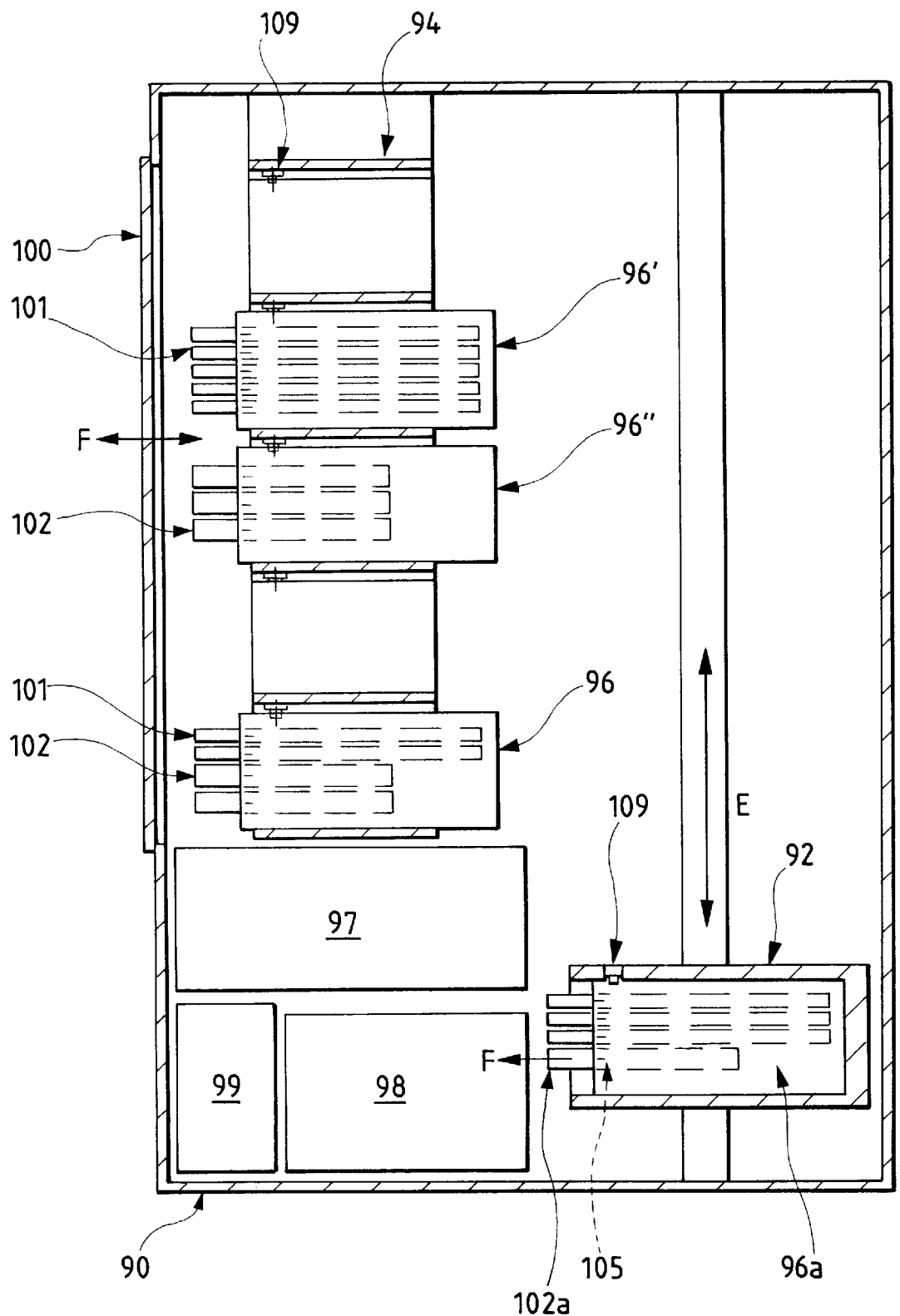
Figure 8C:
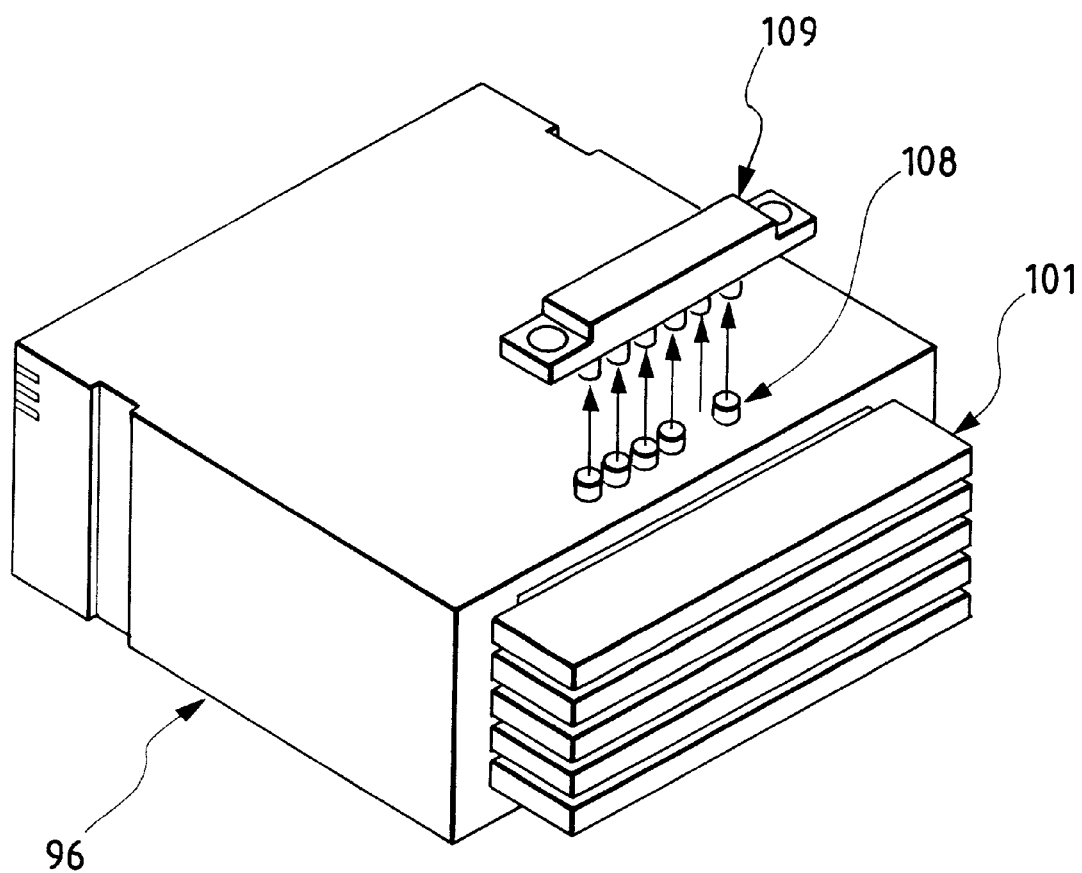

In the construction shown in FIGS. 8A to 8B, the reflection type optical sensor 110 is installed at only two locations to detect the relative positions to the recording/reproducing apparatuses 97 and 98 and therefore, it is necessary for the magazine to pass the reflection type optical sensor 110 once without fail. To shorten the cartridge loading time, it is necessary that one of the recording/reproducing apparatuses 97 and 98 be selected before the magazine carrying portion 92 arrives at the recording/reproducing apparatuses 97 and 98.

By the reflection type optical sensor 110 being provided between the lowermost stage of the housing shelf 94 and the recording/reproducing apparatus arrived at at first (indicated by 97 in FIGS. 8A to 8C), the shortening of the time is possible. Also, a discriminator for indicating the number and order of different kinds of cartridges contained may be provided on the magazine 92 and design may be made such that the grooves 105 are used only for the detection of the relative position to the recording/reproducing apparatuses. According to the present embodiment, a game file or the like wherein CD-ROM in which text information or the like is recorded and video discs on which video information is recorded are contained in one and the same magazine can be constructed in the unit of magazine.

Also, it is possible to make such design that as shown in FIG. 8, magnetic tape cartridges 102 and optical disc cartridges 101 are contained in discrete magazines 96' and 96", respectively, and the magazines 96' and 96" are installed on the housing shelf 94 so as to be used at the same time with the magazine 96 in which the magazine 96 in which the magnetic tape cartridges 102 and the optical disc cartridges 101 are mixedly contained.

Accordingly, the means utilizing the groove 105 to detect the relative position of the cartridges and the recording/reproducing apparatus is also applicable in the embodiments as the first and second means. The foregoing description is about an example in which the recording mediums are individually contained in the cartridges which are contained in the magazines. That is, the object of use of the auto-changer of the present invention for conveying the magazine is not limited to the recording mediums contained in the cartridges. Particularly, when the recording mediums are optical discs or the like, it is possible to construct the auto-changer easily. Likewise, such a construction that recording mediums contained in cartridges and recording mediums of the uncontained type are mixedly contained in one and the same magazine and recording mediums contained in cartridges and recording mediums of the uncontained type are contained in individual magazines for use in one and the same auto-changer is also possible in the present invention.

In this embodiment, although the discriminator for positional detection of the recording medium in the magazine is composed of the groove 105, other configurations such as an aperture, projection or the like can be used as the discriminator.

The information recording/reproducing apparatus (usually called the drive apparatus) according to each of the above-described three embodiments shows a construction in which the recording mediums in the magazine are inserted in one unit each, but only in the construction of an embodiment wherein magazines are in the same form and/or of the same recording/reproducing type, the use of a recording/reproducing apparatus designed such that the entire magazines are inserted.

As described above, according to the present invention, it can be easily realized to contain a plurality of recording mediums differing in the recording/reproducing type and/or in form in a magazine and suitably select and use one of them. Accordingly, it is possible to suitably select a recording medium suited to the capacity of recording information, accessibility and custody attribute, and files in which various kinds of information such as moving images, static images, figures and texts are mixedly present can be dealt with at a time on one and the same autochanger and also, the file custody of multimedia in the unit of magazine is possible.

Thus, the construction of a multimedia information instrument system excellent in versatility, controllability and maintenance becomes easy.

What is claimed is:

1. An auto-changer, comprising:

a magazine capable of containing a plurality of first cartridges of one size and a plurality of second cartridges of a different size, said magazine having surface bearing discrimination marks positioned to correspond to a specific portion of each cartridge so as to indicate the respective positions of the cartridges contained in said magazine;

a housing shelf in which a plurality of magazines can be interchangeably set;

recording/reproducing means for effecting recording on and/or reproduction from recording media contained in each cartridge, said recording/reproducing means having a cartridge insertion port;

conveying means for conveying said magazine between said housing shelf and said recording/reproducing means;

a sensor for detecting the discrimination marks;

controlling means for controlling said conveying means so that a desired cartridge is brought to a position of the cartridge insertion port of said recording/reproducing means on the basis of a detection result by said sensor of one of the discrimination marks indicating the position of said desired cartridge; and wherein said discrimination marks comprise grooves, each of which is provided at a position corresponding to a center of a corresponding one of the first and second cartridges contained in said magazine.

2. An auto-changer according to claim 1, wherein the discrimination mark detected by said sensor is at least one of an optical pattern and a magnetic pattern.

* * * * *

UNITED STATES PATENT AND TRADEMARK OFFICE
CERTIFICATE OF CORRECTION

PATENT NO. : 5,979,755

DATED : November 9, 1999

INVENTOR(S): MASAHIKO CHAYA  Page 1 of 2

It is certified that error appears in the above-identified patent and that said Letters Patent is hereby corrected as shown below:

```
On the title page, item
```
[57] ABSTRACT:

```
    Line 2, "contained" shall read --contain--.
```

Figure 10B:
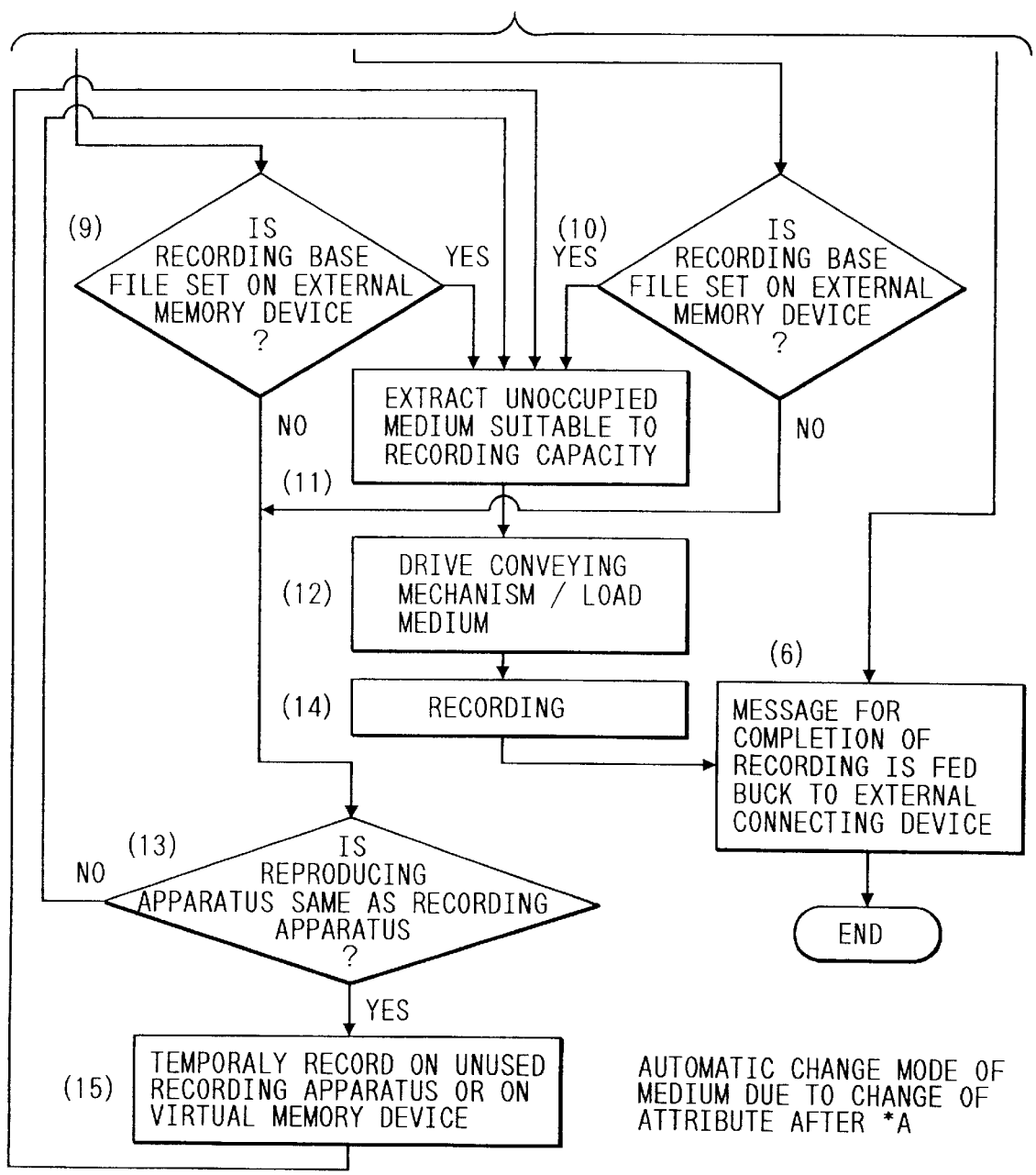
FIG. 10 is comprised of FIGS. 10A and 10B showing flow charts of file custody attribute and selection of recording mediums in the auto-changer.

SHEET 15:

```
    FIG. 10B, "FROM FIG. 10B" should read --FROM FIG. 10A--,
      "BUCK" should read --BACK-- and "TEMPORALY" should read
      --TEMPORARILY--.
```

COLUMN 1:

```
    Line 37, "caridge" should read --cartridge--.
```

COLUMN 3:

```
    Line 34, "shaped" should read --shape--.
```

UNITED STATES PATENT AND TRADEMARK OFFICE
CERTIFICATE OF CORRECTION

PATENT NO. : 5,979,755

DATED : November 9, 1999

INVENTOR(S): MASAHIKO CHAYA

It is certified that error appears in the above-identified patent and that said Letters Patent is hereby corrected as shown below:

COLUMN 4:

Line 5, "shaped" should read --shape--.

Signed and Sealed this

Twenty-seventh Day of March, 2001

*Attest:*

NICHOLAS P. GODICI

*Attesting Officer*  *Acting Director of the United States Patent and Trademark Office*